United States Patent
Melvin

(10) Patent No.: US 7,739,452 B2
(45) Date of Patent: *Jun. 15, 2010

(54) METHOD AND APPARATUS FOR HARDWARE ENFORCED VIRTUAL SEQUENTIALITY

(76) Inventor: Stephen Waller Melvin, 967 14th St., San Francisco, CA (US) 94114

( * ) Notice: Subject to any disclaimer, the term of this patent is extended or adjusted under 35 U.S.C. 154(b) by 0 days.

This patent is subject to a terminal disclaimer.

(21) Appl. No.: 12/400,437

(22) Filed: Mar. 9, 2009

(65) Prior Publication Data

US 2009/0193216 A1 Jul. 30, 2009

Related U.S. Application Data

(63) Continuation of application No. 11/930,202, filed on Oct. 31, 2007, now Pat. No. 7,506,104, which is a continuation of application No. 11/530,895, filed on Sep. 11, 2006, now Pat. No. 7,441,088, which is a continuation of application No. 11/306,375, filed on Dec. 26, 2005, now Pat. No. 7,107,402, which is a continuation of application No. 10/065,340, filed on Oct. 6, 2002, now Pat. No. 6,981,110.

(60) Provisional application No. 60/347,781, filed on Oct. 23, 2001, provisional application No. 60/339,077, filed on Oct. 30, 2001, provisional application No. 60/348,217, filed on Nov. 9, 2001, provisional application No. 60/332,425, filed on Nov. 16, 2001.

(51) Int. Cl.
*G06F 12/00* (2006.01)

(52) U.S. Cl. .................. 711/118; 711/154; 711/158; 711/221; 709/216; 709/229; 370/394

(58) Field of Classification Search ............... 711/118, 711/154, 158, 221; 370/394; 709/216, 229
See application file for complete search history.

(56) References Cited

U.S. PATENT DOCUMENTS

| | | | | |
|---|---|---|---|---|
| 5,193,188 | A | | 3/1993 | Franaszek |
| 5,269,017 | A | | 12/1993 | Hayden |
| 5,655,096 | A | | 8/1997 | Branigin |
| 5,905,998 | A | | 5/1999 | Ebrahim |
| 5,923,655 | A | * | 7/1999 | Veschi et al. ............... 370/394 |
| 5,931,957 | A | | 8/1999 | Konigsburg |
| 5,964,835 | A | * | 10/1999 | Fowler et al. ............... 709/216 |
| 6,079,006 | A | | 6/2000 | Pickett |
| 6,611,883 | B1 | | 8/2003 | Avery |
| 6,665,708 | B1 | | 12/2003 | Tikekar |
| 6,977,934 | B1 | * | 12/2005 | Dalby et al. ............... 370/394 |
| 6,981,110 | B1 | | 12/2005 | Melvin |

(Continued)

*Primary Examiner*—Stephen C Elmore
(74) *Attorney, Agent, or Firm*—McDonnell Boehnen Hulbert & Berghoff LLP

(57) ABSTRACT

A mechanism receives memory reads and writes from a packet processing engine, each memory access having an associated packet identifier or sequence number. The mechanism is placed between a processing engine and a memory system such that write data is buffered and information based upon reads and writes is recorded. Memory read data is returned speculatively since the packet processing engine is processing packets in parallel and not necessarily in sequence. Information is maintained allowing the detection of a speculative read that was incorrect (i.e. a memory conflict). When a memory conflict is detected, a restart signal is generated and the information for the associated packet identifier or sequence number is flushed.

20 Claims, 6 Drawing Sheets

U.S. PATENT DOCUMENTS

| | | |
|---|---|---|
| 7,107,402 B1 | 9/2006 | Melvin |
| 7,441,088 B1 | 10/2008 | Melvin |
| 7,444,481 B1 | 10/2008 | Melvin |
| 7,475,200 B1 | 1/2009 | Melvin |
| 7,475,201 B1 | 1/2009 | Melvin |
| 7,478,209 B1 | 1/2009 | Melvin |
| 7,487,304 B1 | 2/2009 | Melvin |
| 7,496,721 B1 | 2/2009 | Melvin |

* cited by examiner

Read Table

| | Seq. | Addr. |
|---|---|---|
| p: | 1 | A |
| q: | 2 | B |
| s: | 3 | B |
| t: | 2 | A |

Write Table

| | Seq. | Addr. | Data | Depend |
|---|---|---|---|---|
| r: | 2 | B | X | 3 |
| u: | 1 | A | X | (null) |

Fig. 5

METHOD AND APPARATUS FOR HARDWARE ENFORCED VIRTUAL SEQUENTIALITY

RELATED APPLICATIONS

This application is a continuation of application Ser. No. 11/930,202, filed on Oct. 31, 2007, which is a continuation of application Ser. No. 11/530,895, filed on Sep. 11, 2006, now U.S. Pat. No. 7,441,088, issued Oct. 21, 2008, which is a continuation of application Ser. No. 11/306,375, filed on Dec. 26, 2005, now U.S. Pat. No. 7,107,402, issued Sep. 12, 2006, which is a continuation of application Ser. No. 10/065,340, filed on Oct. 6, 2002, now U.S. Pat. No. 6,981,110, issued Dec. 27, 2005, which claims priority to application 60/347,781 filed on Oct. 23, 2001, application 60/339,077 filed on Oct. 30, 2001, application 60/348,217 filed on Nov. 9, 2001, and application 60/332,425 filed on Nov. 16, 2001. Each of these priority documents is incorporated herein by reference.

FIELD OF THE INVENTION

The present invention relates to the field of central processing unit (CPU) architecture and microarchitecture, and pertains more particularly to CPUs for networking applications that process multiple packets simultaneously.

BACKGROUND

Internet networking hardware involves processing of packets of information for many purposes and at many stages in a network. Routers, firewalls, gateways, load balancers and servers all process packets of information in some way. Where in the network the processing takes place (i.e. in the core or close to the edge) has a great deal to do with what types of processing needs to take place and how fast that processing must occur. In general, processing closer to the core takes place faster and involves less work. For example, many core routers perform only layer 2 packet forwarding (i.e. link layer header modification), which can be done with minimal processing overhead. Edge routers, however, typically perform more functions, such as traffic shaping, monitoring, billing and quality of service enforcement. In both situations, the need for processing is constantly evolving, and there is an increasing need to do more at faster rates.

Two key trends are the increase in network speed and the increase in the amount of processing that needs to take place at each stage in the network. Together these trends are forcing packet processing solutions into greater degrees of parallelism. FIG. 1 illustrates this point with four different scenarios for a packet processor. Here the term "packet processor" is used to generally refer to any processing engine that can perform programmable operations on packets of information.

In the first scenario of FIG. 1, the processing time of the packet is the same or smaller than the transmission time of the packet. In this scenario, the code need not be concerned with dependencies between packets, and ordinary single-threaded non-parallel processors can be used. In the other scenarios of FIG. 1, the processing time for a packet is substantially longer than the transmission time of one packet of information. The common trend is that the need for more complex operations (and thus larger workloads) and/or the increase in network speeds has lead to these situations.

In many cases the workload time is dominated by memory latency due to poor locality of data references and large working set sizes. This means that the limitation on packet throughput is driven by memory throughput, which has tended to increase at a rate even slower than single-threaded processor performance, further driving packet processing solutions into parallel packet processing scenarios.

In the case that all packets can be operated on independently, as shown in the second scenario of FIG. 1, processing can be pipelined neatly and no conflict arises between code processing simultaneous packets. This would be the case in certain types of stateless firewalls and forwarding engines, where each packet is evaluated according to static rules and does not depend on any other packets. Thus, no state is changed by packet that affects a future packet. The forwarding tables and firewall rules might be dynamically modified, but this typically happens on a time scale orders of magnitude greater then the time to process a single packet. A parallel packet processing solution for this second scenario is relatively easy to implement. The code working on one packet need not be aware of other packets and there is no need to synchronize memory operations between packets.

In the more general case that dependencies can arise between packets, a more complicated situation exists. This is shown in the third and fourth scenarios of FIG. 1. This would be the case if both packets are from the same TCP connection and due to, for example, encryption or TCP state maintenance, there is a need to update state in memory between the processing of the two packets. One or more memory locations written by one packet will be read by the other packet. Note that packet #3 in these scenarios is independent from both packets and can be processed as soon as it arrives.

Other examples in which packet dependencies can arise would be the updating of traffic management counters and the updating of routing or address translation tables. In the latter case, two packets may be dependent even if they are from completely independent connections if they hash to the same table entry. One packet may want to modify a table entry while another packet is querying the same entry. The fourth scenario in FIG. 1 illustrates that in some, if not most cases it does not matter which order two dependent packets are processed, as long as they are serialized to prevent incorrect results.

In these cases where simultaneous processing of packets is required, and where dependencies can exist between packets, it can be complicated to enforce those dependencies. Currently, there are two common approaches to this problem. The first solution is a software solution, where software locks are included in the code to cause dependent packet processing to be delayed until an earlier packet has been completed. These software semaphores are used to lock out subsequent dependent packets from accessing state until the first packet has updated it. The second solution involves hardware, where packet classification hardware serializes all packets that can possibly be dependent. In a multiprocessor, this can involve generating a hash function that sends all packets of the same flow to the same processor, and distributes the load across multiple processors.

Unfortunately, packet processing code is often large and complex and modifying it to incorporate new locking mechanisms is not trivial. Even when such code is relatively simple, guaranteeing that software locks have been correctly programmed for all possible network traffic scenarios can be hard to verify. Furthermore, requiring hardware to enforce sequentiality when it is not needed lowers performance. This is because often the entire packet processing is not dependent such that a partial overlap is possible. The importance of a partial overlap of packet workload can be appreciated by referring to FIG. 2. In the case that a packet reads data as its first instruction and writes that same address as its last instruction, indeed there can be no overlap of processing. This is generally not the case however. The second scenario of FIG. 2 illustrates the case that the second packet can start before the first packet is completed, even though they are dependent. It is also the case that due to conditional branches, packets that are sometimes dependent may not always be dependent. Thus conservative locking and large grained locking can yield significantly sub-optimal solutions.

It is also the case that hardware solutions that group flows for multiprocessors suffer from the problem of guaranteeing that the grouping is relatively uniform over time in order to balance work across the multiple processing elements. The classification of packets to direct them to processing elements is constrained by having to preserve correctness and can't take advantage of a more dynamic load balancing approach.

What is needed is a hardware mechanism to preserve packet dependencies without requiring changes to software and allowing optimal enforcement of dependencies, such that packets are not serialized unless necessary by the overlying application.

BRIEF SUMMARY OF THE INVENTION

The present invention is a hardware mechanism for enforcing packet dependencies without any changes in software. This mechanism has the important advantage that packet dependencies are enforced by hardware only when required and potentially with no discarded work. The software can be written with the view that each packet is handled in order of arrival with no overlap with subsequent packets. This mechanism optimizes performance for the common case that no dependencies are present and doesn't require the hardware to be pre-configured with knowledge of what packet sequences will and will not be dependent.

BRIEF DESCRIPTION OF THE DRAWINGS

FIG. 5 illustrates detail of the read table and write table of an embodiment of the present invention and illustrates how the tables respond to a sequence of packet reads and writes.

DETAILED DESCRIPTION

The present invention is incorporated into a packet processor in which multiple packets are processed simultaneously. This can be implemented using a multiprocessor, a multi-threaded processor or a combination of both. The mechanism is not dependent on the type of processor used. It would be useful in any form of packet processor in which some form of simultaneity exists such that more than one packet at a time is being processed.

There are a few requirements placed on the packet processor. The first is that a time stamp or sequence number is associated with each packet as it arrives. The sequence number is used to enforce the sequential processing model. When a packet enters the processor, a new sequence number is generated and that sequence number is associated with the instructions that are processing that packet. The packet processor is required to include this sequence number with all memory operations (reads and writes) performed. An additional requirement is that when a packet enters the processor and when a packet leaves the processor (or when processing ends for that packet), a notification of that event is made to the hardware. The information about when a packet enters and leaves is used to know when write data can be committed to memory.

Finally, the packet processor must have the ability to restart processing for each packet. To accomplish this a signal is generated that indicates that a conflict has been detected, which requires the packet processor to discard all work associated with the indicated sequence number and to restart processing that packet. The processor does not have to reconstruct any information, but only to start from the beginning of the packet again assuming that all memory writes have been discarded. It must be possible to restart a packet even after packet processing has ended for that packet. This is needed because an older packet that is still processing may do something that nullifies the processing that has already been completed by a younger dependent packet.

Figure 3:
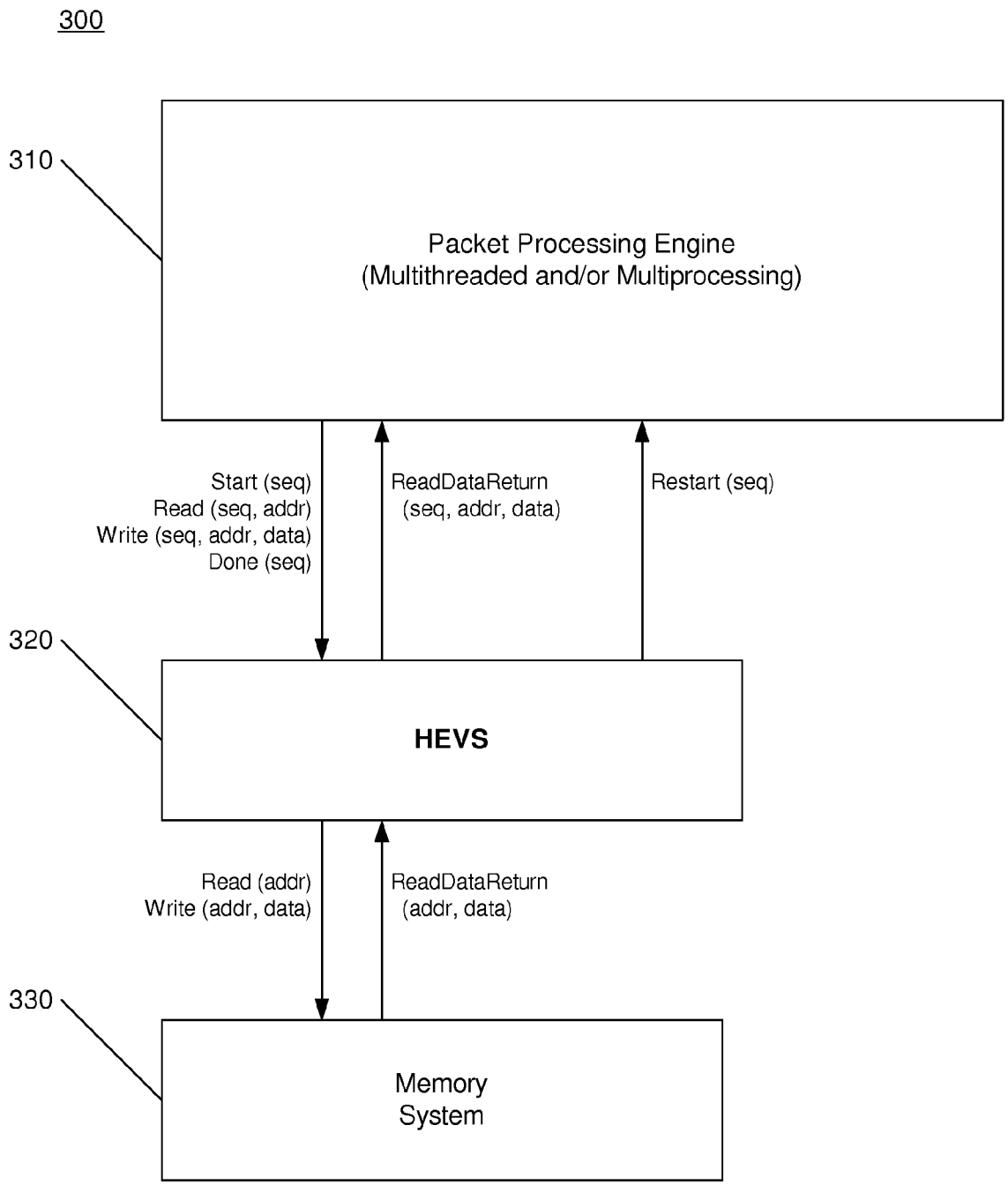
FIG. 3 is a block diagram showing how the present invention fits within a packet processor.

The present invention is responsible for guaranteeing that the results obtained while simultaneously processing multiple packets are the same as would be obtained if all packet processing occurred in the sequence of packet arrival. This hardware mechanism is placed between the packet processing engine and the memory system as shown in FIG. 3. Packet processing engine 310 is a parallel processing engine, incorporating multithreading and/or multiprocessing. The present invention (HEVS) 320 is situated between packet processing engine 310 and the memory system 330.

The packet processing engine 310 generates four types of commands to the HEVS mechanism 320: memory read, memory write, packet start and packet done. Each command includes a sequence number associated with the packet for which the operation applies. Returning to the packet processor are the read data returning, and a restart signal that is used to indicate to the packet processor that a particular packet needs to be restarted.

Figure 4:
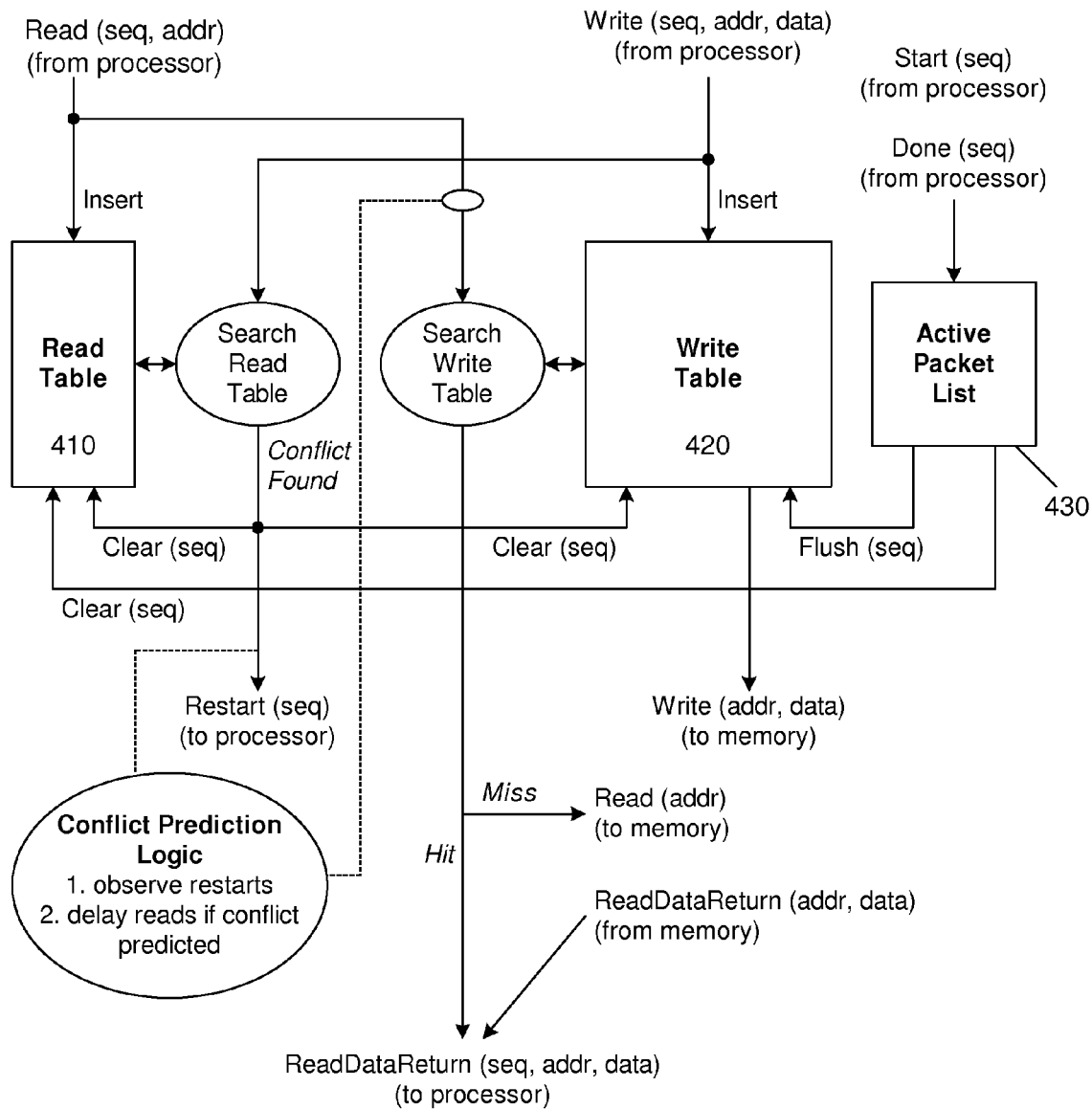
FIG. 4 is a block diagram illustrating an embodiment of the present invention.

FIG. 4 illustrates a diagram of an embodiment of the present invention. There are two tables, a Read Table 410 and a Write Table 420 at the core of the design. The Read Table records all memory reads. The sequence number and the address are recorded, but not the data. Each time a read is accepted from the packet processor, an entry is inserted in the Read Table. To save space in the read table, it may be constructed to not save all address bits, but to discard some of the least significant address bits. If an entry being inserted matches an entry already in the table, it need not be inserted. The Read Table is searched whenever a write is accepted from the packet processor to determine if a conflict has arisen.

The Write Table 420 records all writes, including the sequence number, the address, the data and dependency information for forwarded reads. Each time a write is accepted from the packet processor, an entry is made in the Write Table. To save space in the Write Table, an entry can include a larger amount of storage than a single reference can generate. For example a Write Table entry could contain 64 bytes of data with valid bits associated with each byte. This would allow multiple writes to the same 64-byte area with the same sequence number to be combined into the same entry. Two different accesses with different sequence numbers cannot be combined. The Write Table is searched whenever a read is accepted to determine if data should be bypassed from the memory system. A record is kept of the fact that data has been forwarded from one packet to another so that when a packet is restarted; all packets potentially corrupted by that packet are also restarted.

When a sequence number is completed, the active packet list 430 is updated and if the oldest packet active is no longer being processed, data from the Write Table is flushed to memory and all entries for that sequence number are cleared from the Read Table. Note that the packet start command is optional in that it could be inferred from the first read or write received with a new sequence number.

In summary, the operations that are performed for each type of command from the packet processor are as follows:

Read
1. Insert entry into Read Table including sequence number and address.
2. Search Write Table for the newest matching entry that has the same or an older sequence number. If one exists, forward that data back to the network processor and record dependency information. If none exists, send this request to the memory system.

Write
1. Insert entry into Write Table including sequence number, address and data
2. Search Read Table for any entry that is newer than this sequence number and matches the address. If one is found, then:
   a. Signal restart to packet processor of the sequence number associated with the match
   b. Delete all Read Table entries with that sequence number
   c. Delete all Write Table entries with that sequence number Repeat steps a, b and c. if there are multiple matching sequence numbers, and continue down all dependency chains Start
1. Add entry to active packet list Done
1. Mark packet as done in active packet list
2. If packet is the oldest done
   a. Delete all Read Table entries for that sequence number
   b. Flush all Write Table entries for that sequence number to memory
   c. Delete all Write Table entries for that sequence number
   d. Delete the packet from the active packet list Repeat steps a. through d. if the next oldest packet is done FIG. 5 illustrates a sequence of reads and writes further illustrating the operation of the read table 410 and the write table 420. This sequence involves three packets performing a sequence of reads and writes. In this sequence, the final write to address A by packet #1 triggers a restart of both packets #2 and #3. This is due to the fact that data from packet #2 has been forwarded to packet #3. Since packet #2 has been restarted, packet #3 needs to be restarted as well. The time sequence is as follows:

1. Packet #1 reads location A. Entry p: created in Read Table. Write Table is searched, no matches found so memory read is performed.
2. Packet #2 reads location B. Entry q: created in Read Table. Write Table is searched, no matches found so memory read is performed.
3. Packet #2 writes location B. Entry r: created in Write Table. Read Table is searched, no conflicts found.
4. Packet #3 reads location B. Entry 5: created in Read Table. Write Table is searched, entry r: found, data X forwarded and dependency list updated.
5. Packet #2 reads location A. Entry t: created in Read Table. Write Table is searched, no matches found so memory read is performed.
6. Packet #1 writes location A. Entry u: created in Write Table. Read Table is searched for newer sequence read, entry t: is found. Conflict is signaled to processor, Packet #2 is restarted. Entry q; and all other sequence 2 entries are deleted. Deletion of entry r: triggers Packet #3 restart signaled.

However, it should be noted in this example that the read of location A by packet #2, which is the one that triggered the conflict, occurred after the write to location B by packet #2. This means that if packet #2 were able to be backed up and restarted between these two events, rather than at the beginning of processing, then packet #3 would not need to be restarted. This performance enhancement allows the amount of discarded work to be limited. It would involve a checkpoint-backup mechanism within the packet processor in conjunction with the use of sub-sequence numbers. The processor would then be able to restart processing from a safe checkpoint rather than having to back up to the beginning of the packet processing.

Another possible performance enhancement would be to save the data that is returned for each read in the Read Table. This would allow the conflict detection logic to determine if in fact wrong data had actually been returned, and only signal a restart if a data mismatch occurred. This would be advantageous if the packet processing code commonly overwrites data with the same value as is already stored, which may happen in certain applications. In addition, carefully written software could take advantage of a packet processor with this enhancement by purposefully writing an expected value into a variable early in its processing. In the common case, when the final value is written it will be the same and subsequent packets will not need to be restarted.

Figure 1:
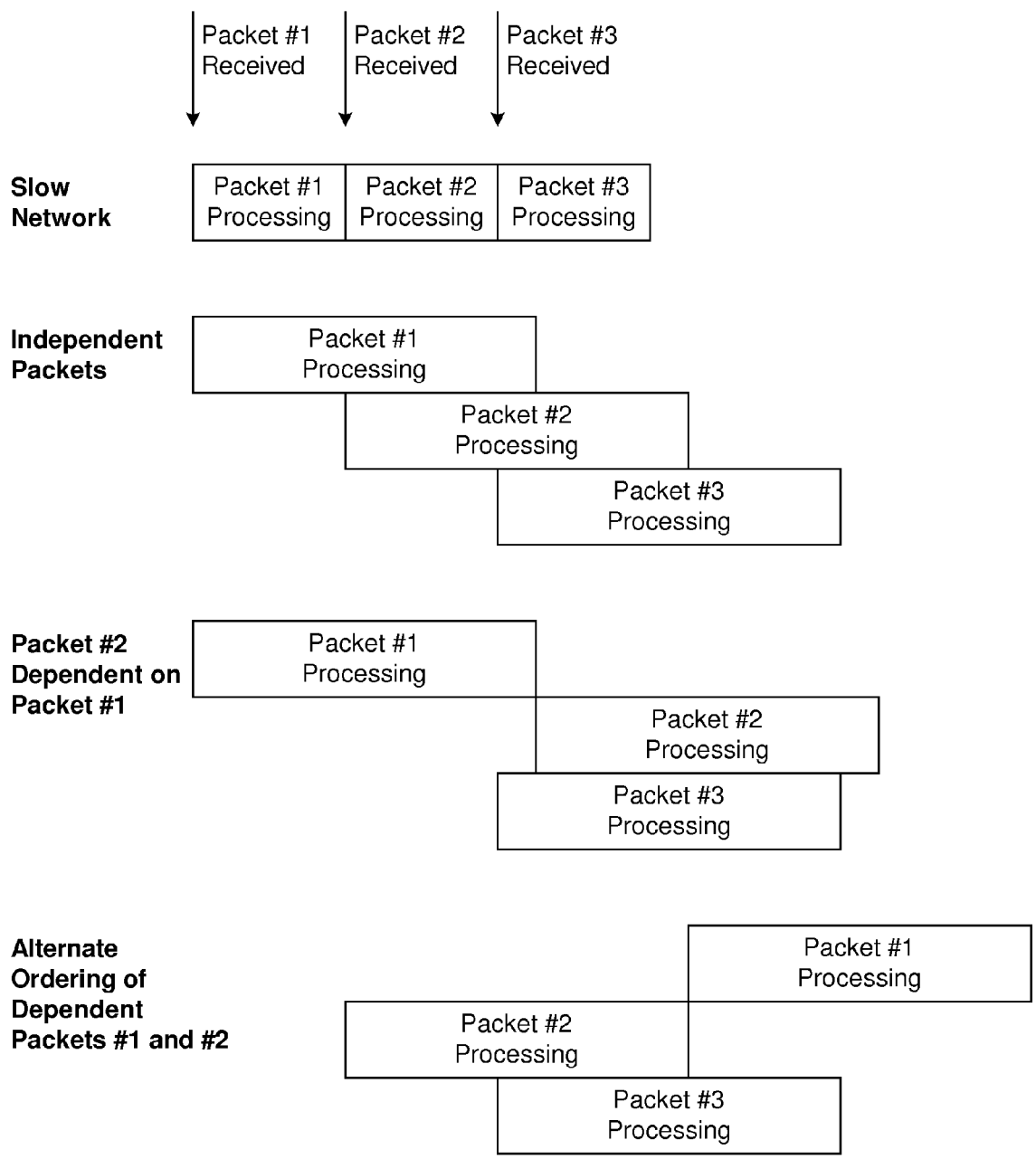
FIG. 1 illustrates four different scenarios for how the processing of three packets can be overlapped.
Figure 2:
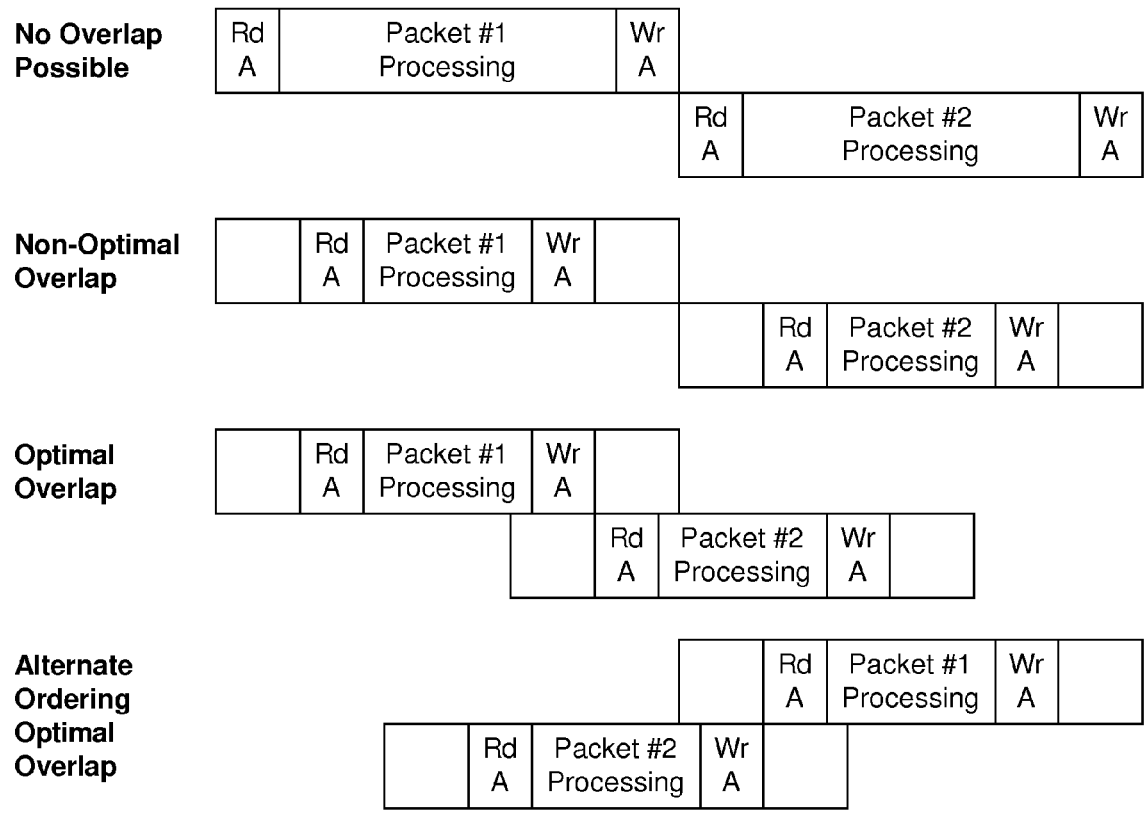
FIG. 2 illustrates four different scenarios for the overlap of the processing of two packets in which a dependency exists.

In many cases, it is not necessary to guarantee that processing yields the same results as if packets had been processed in the specific order of arrival, as long as the results are correct for any specific order. In other words, the packet processing code does not care which packet is processed first as long as there is a consistent order. Packets may in principle be reordered by the network in many cases and higher-level protocols cannot depend on any specific order. This principle has been illustrated in the last scenarios of FIGS. 1 and 2. (However, it is important to note that there are sometimes performance implications to reordering packets if code is written to optimize for cases where dependent packets are processed in order.)

An alternative mode of operation for the packet dependency mechanism described above is to not enforce a specific order, but to signal a conflict only when no consistent order exists. In this mode the packet sequence number is being used as merely a packet identifier rather than a numeric order. The mechanism is modified so that when a write occurs, a packet sequence is defined for any previous read. Then when two packets resolve to two conflicting sequences, one must be restarted.

Figure 6:
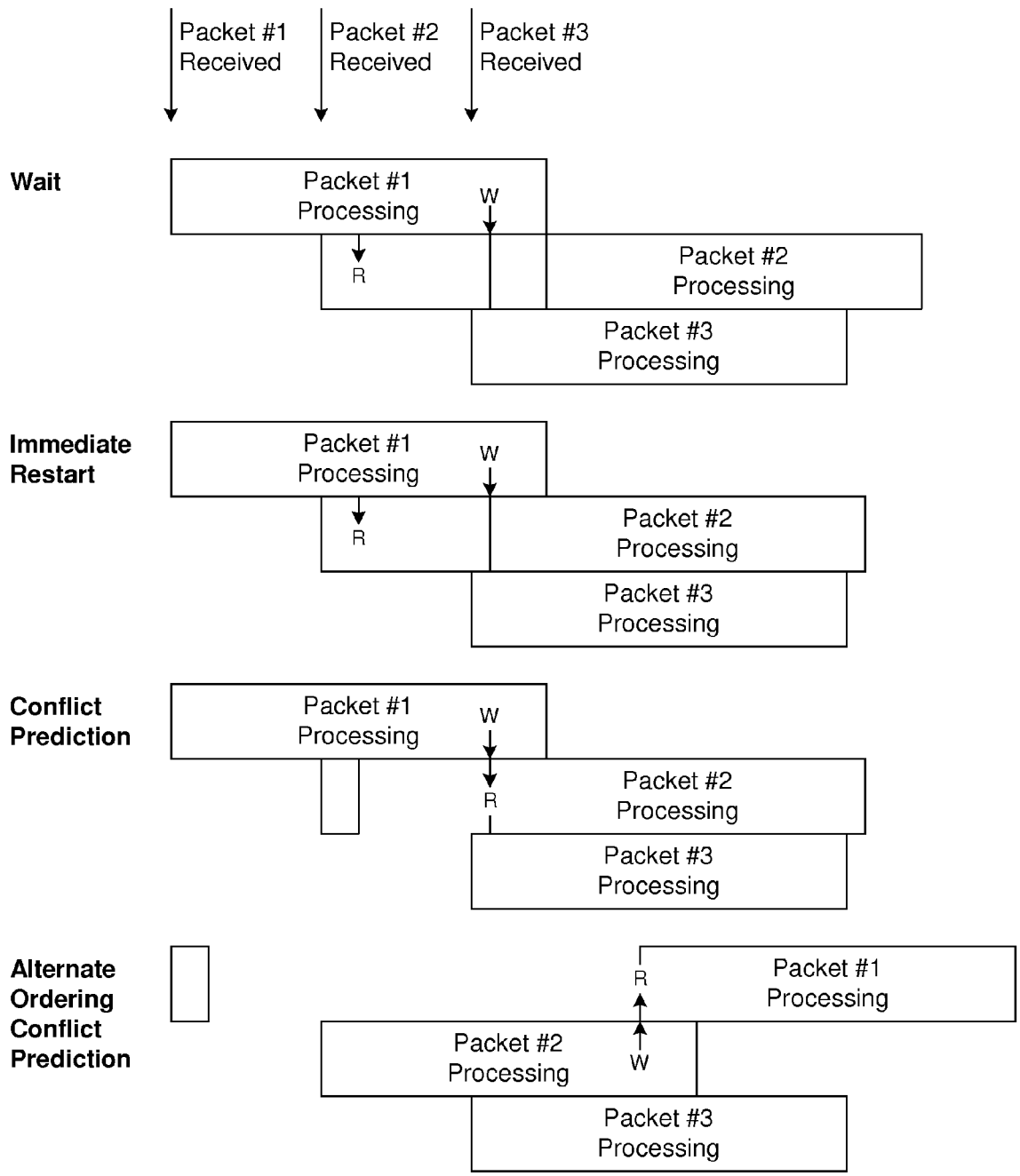
FIG. 6 illustrates four different scenarios for the processing and restart of two packets in conjunction with an embodiment of the present invention.

The present invention can be used to enforce the correctness of a sequential packet processing model in a processor that processes packets simultaneously. Ideally, there should a minimal amount of discarded work. (The importance of minimizing discarded work is particularly relevant in multithreaded processors, where multiple threads all contend for the same execution resources.) In cases where conflicts are common, more careful optimization of the restart mechanism should be implemented. FIG. 6 illustrates four different scenarios for handling packet conflicts.

In this figure the arrow and the R represents a read in packet #2 for which a conflict arises, and the arrow and the W indicates a write in packet #1 that is the source of the conflict. In the first scenario, as soon as the conflict is detected, processing is stalled until the packet that generated the conflict has completed. This can be accomplished by having an additional stall signal to the packet processor, or by having the mechanism delay the return of the first read operation received after processing resumes for packet #2.

This first scenario is a conservative approach that essentially predicts that if a first conflict between two packets arises, then other conflicts between those two packets are likely to arise and therefore no more work should be expended on the second packet until the first packet is done.

In the second scenario of FIG. 6, processing is immediately restarted on the second packet after work is discarded and the Read Table and Write Table are flushed. This approach essentially predicts that there is likely to be only one conflict between two packets, so the second packet should not be further delayed and processing should continue immediately. If a second conflict arises then the process is repeated. This may tie up processing resources within the packet processor that could be used for performing other tasks. The performance of the first two approaches shown in FIG. 6 is dependent on the traffic characteristics and on the characteristics of the packet workload.

Many more sophisticated mechanisms are possible. A conflict predictor could be implemented that would observe sequences of packet conflicts and develop a history to guess when memory operations would conflict. The information used in the predictor could be information from the packet header of each packet (e.g. source and destination IP number, and source and destination port number), as well as the memory addresses of the read and write involved. Ideally, a hardware conflict predictor would know when a read operation is received that it should not be allowed to complete since a write from an earlier packet is likely in the future. The third scenario of FIG. 6 illustrates the ideal situation when the hardware predictor is used to stall the memory read until the write from packet #1 occurs. The memory read is then completed and processing continues. In this case, there is no discarded work, and packet #2 is delayed the minimum time necessary to guarantee correct results.

Note that in the third scenario the second packet completes in the earliest time and the least machine resources are used. The advantage of a dynamic hardware conflict predictor is that it can adapt to changing application conditions and only apply stalls to read operations when there is a high likelihood of a conflict. The forth scenario of FIG. 6 illustrates the opposite ordering of packets #1 and #2 in the case that the read and write occur at the same point. It may be acceptable for the hardware to guarantee either ordering rather than adhere to a strict order of arrival model.

All of the above description and teaching is specific to various embodiments of the present invention, and it should be clear to the skilled artisan that there are many alterations and amendments that might be made to the examples provided, without departing from the spirit and scope of the invention.

The invention claimed is:

1. A method, comprising:
receiving a memory read having a first associated sequence number;
receiving a memory write having a second associated sequence number;
determining that a memory conflict exists based on the first associated sequence number and the second associated sequence number; and
responsively restarting processing of data associated with the first associated sequence number.

2. The method of claim 1, wherein receiving the memory read comprises:
recording a first address and the first associated sequence number in a read table;
searching a write table for a matching entry with an address matching the first address and a sequence number that is less than or equal to the first associated sequence number; and
responsive to finding the matching entry in the write table, retrieving data from the write table.

3. The method of claim 2, further comprising:
responsive to not finding the matching entry in the write table, sending the memory read to a memory system.

4. The method of claim 2, wherein receiving the memory write comprises:
recording a second address, the second associated sequence number, and write data in the write table.

5. The method of claim 4, wherein determining that the memory conflict exists comprises:
searching the read table for an address matching the second address and a sequence number that is greater than the second associated sequence number.

6. The method of claim 5, further comprising:
receiving a start command with a third associated sequence number; and
receiving a done command with a fourth associated sequence number.

7. The method of claim 6, further comprising:
sending write data to a memory system upon receipt of the done command; and
responsively flushing the entries in the read table and the write table corresponding to the fourth associated sequence number.

8. The method of claim 1, further comprising:
determining a prediction of the memory conflict; and
responsively applying a stall to a memory system.

9. The method of claim 8, wherein determining the prediction of the memory conflict comprises:
receiving one or more memory reads;
determining one or more read addresses associated with the one or more memory reads;
receiving one or more memory writes;
determining one or more write addresses associated with the one or more memory writes; and
determining the prediction based on the one or more read addresses and the one or more write addresses.

10. The method of claim 8, wherein the prediction comprises predicting a memory write; and
wherein responsively applying the stall comprises delaying at least one memory read until the predicted memory write occurs.

11. An controller, comprising:
means for receiving a memory read having a first associated sequence number;
means for receiving a memory write having a second associated sequence number;
means for determining that a memory conflict exists based on the first associated sequence number and the second associated sequence number; and
means for restarting processing of data associated with the first associated sequence number based on the determined memory conflict.

12. The controller of claim 11, wherein the means for receiving the memory read comprise:
means for recording a first address and the first associated sequence number in a read table;
means for searching a write table for a matching entry with an address matching the first address and a sequence number less than or equal to the first associated sequence number; and means for retrieving data from the write table, responsive to finding the matching entry in the write table.

13. The controller of claim 12, further comprising:
means for sending the memory read to a memory system, responsive to not finding the matching entry in the write table.

14. The controller of claim 12, wherein the means for receiving the memory write comprise:
means for recording a second address, the second associated sequence number, and write data in the write table.

15. The controller of claim 14, wherein the means for determining that the memory conflict exists comprise:
means for searching the read table for an address that matches the second address and a sequence number that is greater than the second associated sequence number.

16. The controller of claim 15, further comprising:
means for receiving a command, wherein the command is either a start command with a third associated sequence number, or a done command with a fourth associated sequence number.

17. The controller of claim 16, further comprising:
means for sending write data to a memory system upon receipt of the done command; and
means for responsively flushing the entries in the read table and the write table corresponding to the fourth associated sequence number.

18. The controller of claim 11, further comprising:
means for determining a prediction of the memory conflict; and
means for applying a stall to a memory system in response to predicting the memory conflict.

19. The controller of claim 18, wherein the means for determining the prediction of the memory conflict comprise:
means for receiving one or more memory reads, each of the one or more memory reads comprising one or more read addresses;
means for receiving one or more memory writes, each of the one or more memory writes comprising one or more write addresses; and
means for determining the prediction based on the one or more read addresses and the one or more write addresses.

20. The controller of claim 18, wherein the prediction of the memory conflict comprises predicting a memory write; and
wherein the means for applying the stall comprise means for delaying at least one memory read until the predicted memory write occurs.

* * * * *